United States Patent
Olds

(10) Patent No.: US 7,062,228 B2
(45) Date of Patent: Jun. 13, 2006

(54) CELLULAR COMMUNICATIONS SYSTEM USING BASEBAND CARRIER INJECTION AND RELATED METHODS

(75) Inventor: Keith Andrew Olds, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 83 days.

(21) Appl. No.: 10/842,742

(22) Filed: May 10, 2004

(65) Prior Publication Data

US 2005/0250450 A1  Nov. 10, 2005

(51) Int. Cl.
*H04B 1/00* (2006.01)
*H04B 7/00* (2006.01)

(52) U.S. Cl. .................. 455/70; 455/71; 455/63.1; 455/67.11; 455/227; 375/281; 375/308; 375/332; 332/103

(58) Field of Classification Search ......... 455/67.11, 455/16, 67.7, 68–69, 201–202, 226.1–3, 455/63.1, 70–71, 108–109, 136, 139, 227–229, 455/418–420; 375/141, 281, 308, 332, 142, 375/145, 149–150, 271, 303–307; 332/100–105
See application file for complete search history.

(56) References Cited

U.S. PATENT DOCUMENTS

| | | | | |
|---|---|---|---|---|
| 4,216,542 A | | 8/1980 | Hermesmeyer | 375/67 |
| 4,581,748 A | * | 4/1986 | Sasaki et al. | 375/261 |
| 5,212,814 A | | 5/1993 | Iwane | 455/107 |
| 5,748,623 A | | 5/1998 | Sawahashi et al. | 370/342 |
| 5,805,640 A | * | 9/1998 | O'Dea et al. | 375/296 |
| 5,847,619 A | * | 12/1998 | Kirisawa | 332/103 |
| 5,914,950 A | | 6/1999 | Tiedemann, Jr. et al. | 370/348 |
| 5,991,336 A | * | 11/1999 | Scholtz et al. | 375/222 |
| 6,025,758 A | * | 2/2000 | Lu | 332/100 |
| 6,094,450 A | | 7/2000 | Shockey | 375/141 |
| 6,222,878 B1 | * | 4/2001 | McCallister et al. | 375/225 |
| 6,396,880 B1 | | 5/2002 | Stroud | 375/308 |
| 6,430,212 B1 | * | 8/2002 | Alisobhani et al. | 375/141 |
| 6,606,357 B1 | * | 8/2003 | Cobb et al. | 375/281 |
| 2003/0202460 A1 | * | 10/2003 | Jung et al. | 370/208 |
| 2004/0219884 A1 | * | 11/2004 | Mo et al. | 455/67.11 |
| 2004/0248516 A1 | * | 12/2004 | Demir et al. | 455/63.1 |

OTHER PUBLICATIONS

Cavers, An Analysis of Pilot Assisted Modulation of Rayleigh Fading Channels, IEEE Transactions on Vehicular Technology, vol. 40, No. 4, Nov. 1991, pp. 686-693.

* cited by examiner

*Primary Examiner*—Matthew Anderson
*Assistant Examiner*—Tuan Tran
(74) *Attorney, Agent, or Firm*—Allen, Dyer, Doppelt, Milbrath & Gilchrist, P.A.

(57) ABSTRACT

A cellular communications system may include one or more cellular base stations and a plurality of mobile cellular communications devices for communicating therewith. More particularly, the cellular base station and the mobile cellular communications devices may each include an encoder for generating an information signal. Furthermore, a modulator may generate a modulated waveform based upon the information signal, a carrier signal having a frequency and phase associated therewith, and at least one carrier phase reference symbol. The modulator may also include an offset circuit so that the modulated waveform includes a carrier frequency indicator. A transmitter may also be included for transmitting the modulated waveform to the desired cellular base station or mobile cellular communications device.

71 Claims, 11 Drawing Sheets

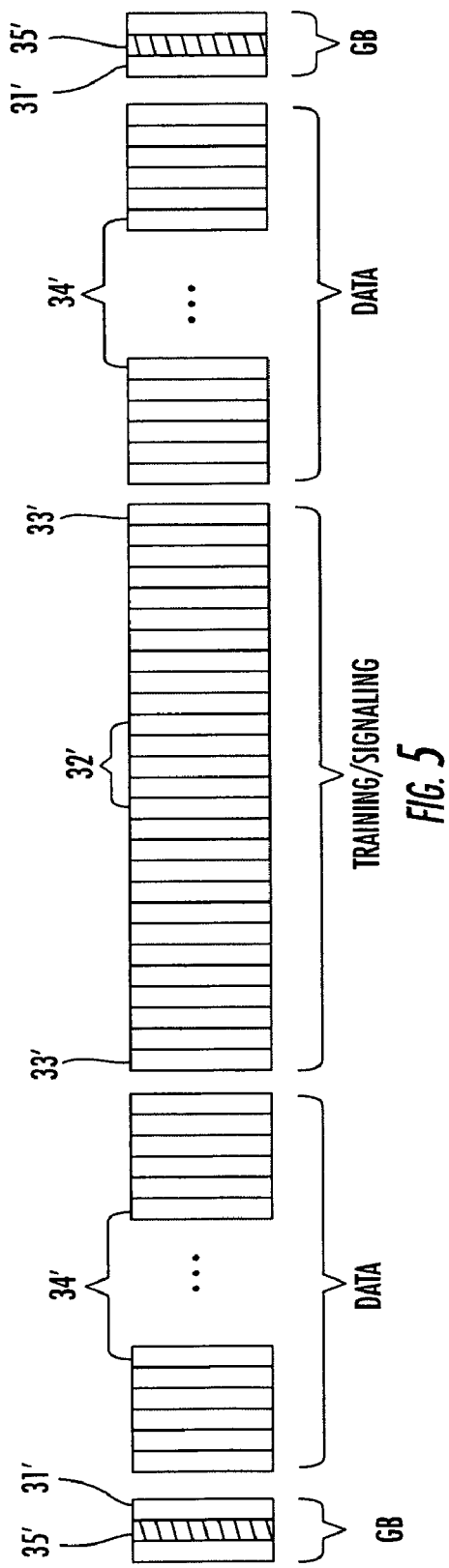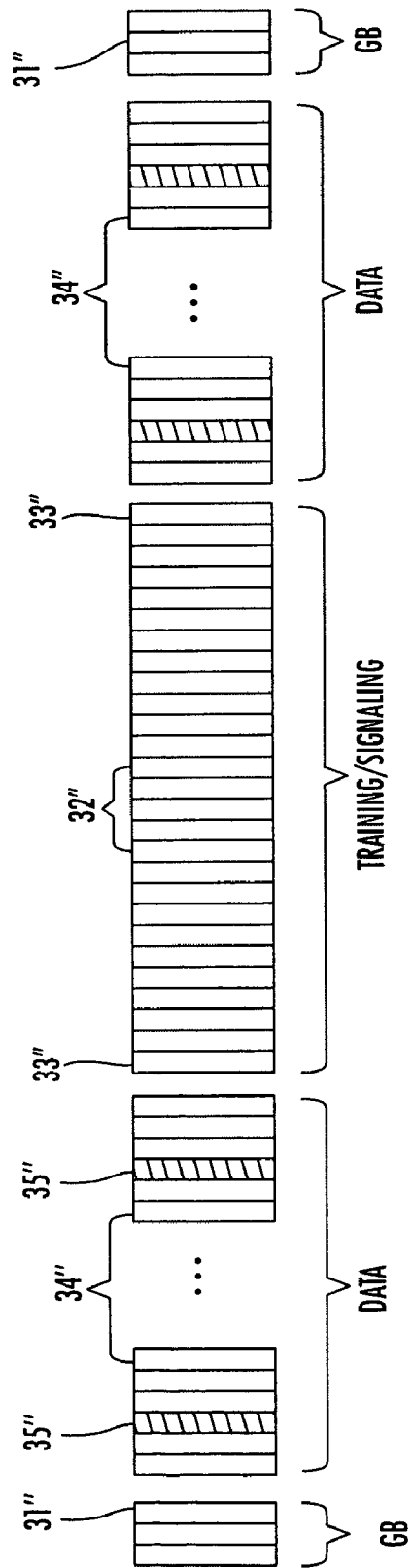

CELLULAR COMMUNICATIONS SYSTEM USING BASEBAND CARRIER INJECTION AND RELATED METHODS

FIELD OF THE INVENTION

The present invention relates to the field of communications systems, and, more particularly, to cellular communications systems and related methods.

BACKGROUND OF THE INVENTION

Cellular communications systems continue to grow in popularity and have become an integral part of both personal and business communications. Cellular phones allow users to place and receive voice calls most anywhere they travel. Moreover, as cellular telephone technology has increased, so too has the functionality of cellular devices. For example, many cellular devices now incorporate personal digital assistant (PDA) features such as calendars, address books, task lists, etc. Moreover, such multi-function devices may also allow users to wirelessly access electronic mail (email) messages and the Internet via a cellular network.

Various cellular communications standards have been developed for cellular communications systems. One of the more prominent standards is the Global System for Mobile Communications (GSM) for digital cellular systems. To more readily accommodate new services such as email, Internet, video, etc., GSM cellular systems are gradually moving toward third generation (3G) technology. General Packet Radio Service (GPRS) is one important advancement in the migration to 3G. GPRS allows a permanent data connection and free information flow for the end user's mobile cellular communications device. GPRS also provides for a more advanced billing and charging system. That is, it allows charging based on the services that a user will access, not simply the duration of the connection.

Another advancement in the migration to 3G is the Enhanced Data Rates for Global Evolution (EDGE). EDGE will allow data speeds up to 384 kbit/s so that the advantages of GPRS may be fully utilized with fast connection set-up and higher bandwidth than traditional GSM technology.

One potential difficulty in the evolution to GPRS and EDGE is that some GSM systems may not be set up to provide the low bit error rate (BER) performance necessary for these services. Achieving high data rates at a low BER may in some cases require large scale additions of base stations, which would result in a substantial cost to a cellular service provider.

In addition, cellular communications often occur in environments where severe fading (i.e., Rayleigh fading) is encountered, which tends to cause burst bit errors. Many of the current GSM/GPRS implementations are designed for voice services, which may be more forgiving with respect to fading and burst bit errors than other services. That is, data services generally require improved error performance, which may result in lower data rates and/or increased numbers of retransmissions. As a result, throughput is decreased, which results in higher costs for the cellular service provider.

One approach for addressing the effects of Rayleigh fading is generally discussed in an article entitled "An analysis of Pilot Symbol Assisted Modulation for Rayleigh Fading Channels" by Carvers, IEEE Transaction on Vehicular Technology, vol. 40, no. 4, November 1991. Carvers discusses the use of pilot symbol assisted modulation (PSAM) to mitigate the effects of rapid fading in mobile communications applications. For PSAM, the transmitter periodically inserts known symbols, from which the receiver derives its amplitude and phase reference. While PSAM reduces the effective bit rate and introduces delay (requiring additional buffer space) at the receiver, Carvers notes that it also advantageously suppresses the error floor and enables multilevel modulation without changing the transmitted pulse shape or peak-to-average power ratio.

Despite such prior art approaches, further improvements may be desirable when implementing new services and functionality with existing GSM or other cellular systems.

SUMMARY OF THE INVENTION

In view of the foregoing background, it is therefore an object of the present invention to provide improved error performance signal characteristic tracking in cellular communications systems and related methods. Another object of the present invention is to maintain compatibility and interoperability with existing cellular standard base stations and mobile communications equipment.

These and other objects, features, and advantages in accordance with the present invention are provided by a cellular communications system which may include at least one cellular base station and a plurality of mobile cellular communications devices for communicating therewith. More particularly, the at least one cellular base station and the mobile cellular communications devices may each include an encoder for generating an information signal. A modulator may also be included for generating a modulated waveform based upon the information signal, a carrier signal having a frequency and phase associated therewith, and at least one carrier phase reference symbol. The modulator may include an offset circuit so that the modulated waveform includes a carrier frequency indicator. In addition, a transmitter may also be included for transmitting the modulated waveform.

By way of example, the offset circuit may bias the information signal, and the carrier frequency indicator may be based upon the bias of the information signal. The carrier frequency indicator may be a predetermined amount of unmodulated carrier energy (i.e., carrier "leakage"). More specifically, the information signal may be a binary digital information signal, and the offset circuit may bias the binary digital information signal by changing values thereof (i.e., from logic 1 to logic 0, or vice-versa). That is, the offset circuit preferably creates an imbalance between ones and zeros in the binary information sequence for biasing the information signal to create carrier leakage in the transmitted signal, which provides the carrier frequency indicator for a receiver.

Moreover, the offset circuit may change the values of the binary digital information signal based upon a ratio of first to second logic values in the binary digital information signal. For example, the offset circuit may determine if the information sequence has more logic ones than zeros, or vice-versa, or if it is substantially balanced in ones and zeros. If it is substantially balanced, the offset circuit overwrites zeros with ones (or vice-versa) so that the ratio of ones to zeros is no longer one-to-one.

By contrast, in common prior art modulators for cellular systems, the ratio of logic 1's and 0's in the information is carefully balanced (i.e., a one-to-one ratio) so that the carrier is suppressed. In such prior art modulators, carrier leakage is considered detrimental to the system operation. However, in accordance with the present invention, carrier leakage is deliberately induced by the "imbalance" in logic values imposed by the offset circuit to inject a small amount of unmodulated carrier energy into the modulated waveform as the carrier frequency indicator, yet without violating the applicable cellular standard. This advantageously allows a receiver to more readily recover the carrier frequency at a lower signal to noise ratio or by using less complicated circuitry, for example.

The offset circuit may also separate the information signal into in-phase (I) and quadrature (Q) components. As such, an alternate approach for the offset circuit to bias the information signal is to bias one or both of the I and Q components with a direct current (DC) offset.

Each of the mobile cellular communications devices and the at least one base station may further include a front end for receiving a modulated waveform, and a carrier reconstructor for determining the phase of the carrier signal associated with the received modulated waveform based upon the at least one phase reference symbol, and for determining the frequency of the carrier signal based upon the carrier frequency indicator. A demodulator may also be included for demodulating the information signal based upon the determined phase and frequency of the carrier signal, as well as a decoder for decoding the demodulated information signal.

Furthermore, the at least one phase reference symbol may be a plurality thereof. As such, the carrier reconstructor may include a phase symbol correlator for correlating the plurality of phase reference symbols. By way of example, the modulated waveform may include a training symbol portion, and the offset circuit may insert the at least one phase reference symbol in the training symbol portion. Similarly, the modulated waveform may include one or more guard band portions and/or data symbol portions, and the offset circuit may insert the at least one phase reference symbol in the guard band and/or data symbol portions. The offset circuit may similarly change the values of the binary digital information signal in the training symbol portion, the guard band portion(s), and/or the data symbol portion(s) to provide the carrier frequency indicator, as noted above.

The modulator may be a Gaussian-filtered minimum shift keying (GMSK) modulator, for example. Also, the at least one cellular base station and the mobile cellular communications devices may operate in accordance with one or more of the Global System for Mobile Communications (GSM) standard, the General Packet Radio Service (GPRS) standard, and the Enhanced Data Rates for Global Evolution (EDGE) standard. Further, the encoder may be a forward error correction (FEC) encoder, for example.

A method aspect of the invention is for communicating between a mobile cellular communications device and a cellular base station. The method may include generating an information signal, and generating a modulated waveform based upon the information signal, a carrier signal having a frequency and phase associated therewith, and at least one carrier phase reference symbol. The modulated waveform may be generated using a modulator including an offset circuit so that the modulated waveform includes a carrier frequency indicator. The method may further include transmitting the modulated waveform.

Yet another method aspect of the invention is for communicating between a mobile cellular communications device and a cellular base station. The method may include receiving a modulated waveform generated based upon an information signal, a carrier signal having a frequency and phase associated therewith, and at least one carrier phase reference symbol, where the modulated waveform has a carrier frequency indicator associated therewith. The method may further include determining the phase of the carrier signal based upon the at least one phase reference symbol, determining the frequency of the carrier signal based upon the carrier frequency indicator, and demodulating the information signal based upon the determined phase and frequency of the carrier signal.

BRIEF DESCRIPTION OF THE DRAWINGS

FIGS. 4–6 are waveform diagrams illustrating symbols of a waveform for a GSM implementation of the cellular communications system of FIG. 1 including phase reference symbols.

DETAILED DESCRIPTION OF THE PREFERRED EMBODIMENTS

Figure 1:
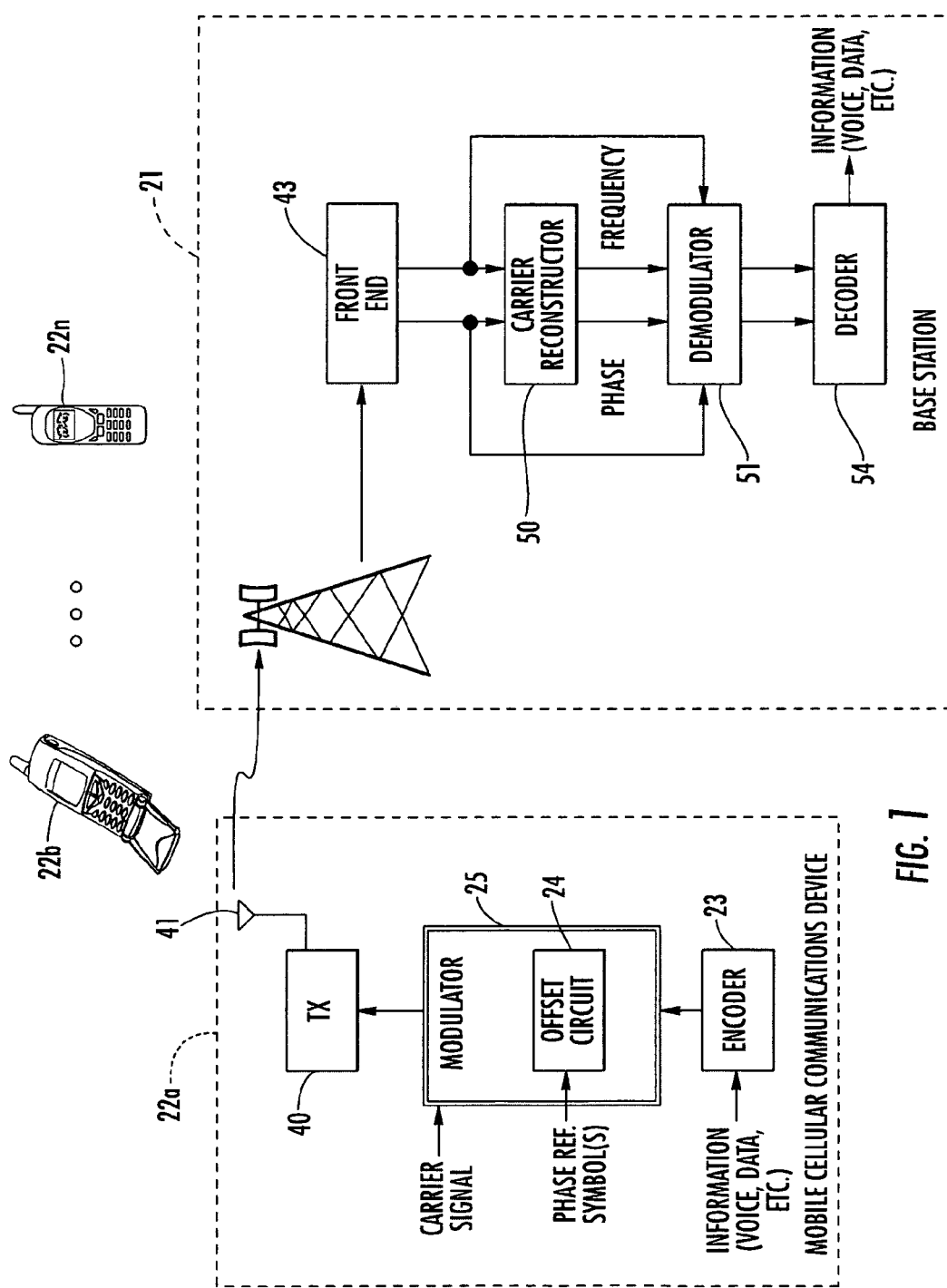
FIG. 1 is a schematic block diagram of a cellular communications system in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple notation are used to indicate similar elements in alternate embodiments.

Referring initially to FIGS. 1–6, a cellular communications system 20 in accordance with the present invention illustratively includes one or more cellular base stations 21 and a plurality of mobile cellular communications devices 22a–22n for communicating therewith. More particularly, the cellular base station 21 and the mobile cellular communications devices 22 each includes respective transmission and reception circuitry, which allows the mobile cellular communications devices to send and receive cellular communications signals to and from the cellular base station, and vice-versa. By way of example, the mobile wireless communications devices 22 may be cellular telephones or multi-function devices which provide personal digital assistant (PDA) features (e.g., calendar, contacts, etc.) as well as electronic mail (email), Internet, image, and other features in addition to cellular voice functionality, as will be appreciated by those skilled in the art.

As noted above, cellular telephone channels tend to be subject to Rayleigh fading. Rayleigh fading causes very rapid fluctuations in signal amplitude and phase. As a result, coherent modulation techniques are typically avoided in environments where this type of fading is prevalent, and differential modulation is instead used. However, the inability to use coherent demodulation techniques reduces the performance that can be achieved, even when fairly powerful forward error correction (FEC) techniques, such as turbo codes, are used in the communications link.

In cellular applications, fading typically results from multi-path transmissions and blockage, as will be appreciated by those skilled in the art. Of course, fading is not unique to cellular communications, and it can be problematic in other applications such as satellite-based communications as well. One particularly advantageous approach for addressing problems caused by fading in satellite communications is disclosed in U.S. Pat. No. 6,606,357 to Cobb et al., which is assigned to the Assignee of the present application, and which is hereby incorporated herein in its entirety by reference. Generally speaking, Cobb et al. discloses a carrier injection waveform-based modulation approach that may be used to facilitate detection and recovery of the carrier at the receiver.

The present invention extends the benefits of the above-noted modulation approach of Cobb et al. to cellular communications systems. In particular, the present invention is particularly well suited for GSM/GPRS/EDGE applications. That is, the present invention may be used to enhance the performance of existing GSM systems so that GPRS and/or EDGE services may be more readily implemented without significant network changes. Thus, for convenience of explanation, the present invention will be described herein with reference to such an implementation, although it may be used with other cellular standards or systems as well.

As will be further understood from the following description, the present invention may allow cellular service providers to more readily implement GPRS and/or EDGE services. Thus, service providers may advantageously be able defer 3G rollouts, which will likely require significant replacements of base station infrastructure as well as obtaining new communications licenses, both of which may be extremely costly.

The base station 21 and the mobile cellular communications devices 22 each includes respective transmission and reception circuitry which allow the base station to communicate with the mobile cellular communications devices, and vice-versa. The transmission circuitry is shown in the mobile cellular communications device 22a, and the reception circuitry is shown in the base station 21, to illustrate a transmission from the former to the latter. However, for clarity of illustration, the respective transmission and reception circuitry of each of the mobile cellular communications devices 22 and the base station 21 are not show.

More particularly, the transmission circuitry illustratively includes an encoder 23 for generating an information signal from information such as voice and/or data (e.g., text, image, etc.) signals, for example. By way of example, the encoder 23 may perform FEC encoding followed by interleaving operation to produce the information signal. While typical GSM systems may not provide for enhanced FEC schemes such as turbo codes, they may be used in accordance with the present invention for EDGE implementations, for example, as will be discussed further below.

Figure 4:
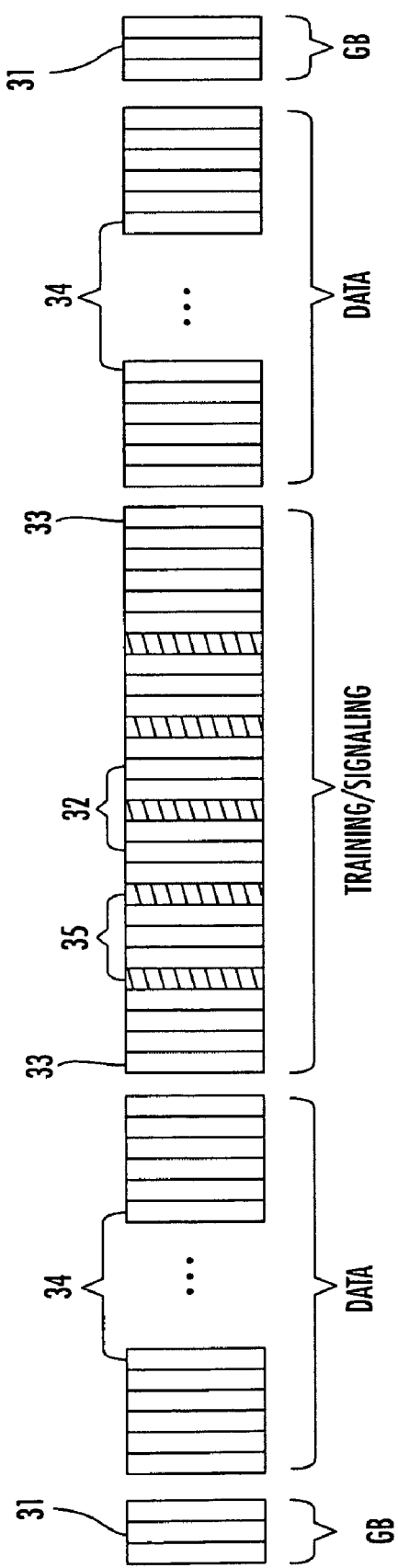

In the case of a GSM implementation, a standard transmission burst will include two guard band portions (GB) each including three guard band symbols 31 at the beginning and end of the burst (FIG. 4). Furthermore, a training symbol section is included in the middle of the burst which has twenty-six training symbols 32, and the training symbol portion is immediately preceded and followed by a signaling symbol 33. Furthermore, a standard GSM burst also includes two information or data symbol portions, each of which includes fifty-seven data symbols 34. One of the data symbol portions precedes the training symbol portion, while the other follows it, as shown. It should be noted that in FIGS. 4–6 spaces are shown between the guard band portions, data symbol portions, and training/signaling symbol portion for clarity of illustration only. In an actual transmission there would typically not be a transmission delay between the different symbol portions.

The transmission circuitry also illustratively includes a modulator 25 for generating a modulated waveform based upon the information signal from the encoder 23, a carrier signal, and one or more phase reference symbols, as will be discussed further below. In accordance with the invention, the modulator 25 illustratively includes an offset circuit 24 so that the modulated waveform includes a carrier frequency indicator, as will also be described further below.

Figure 2:
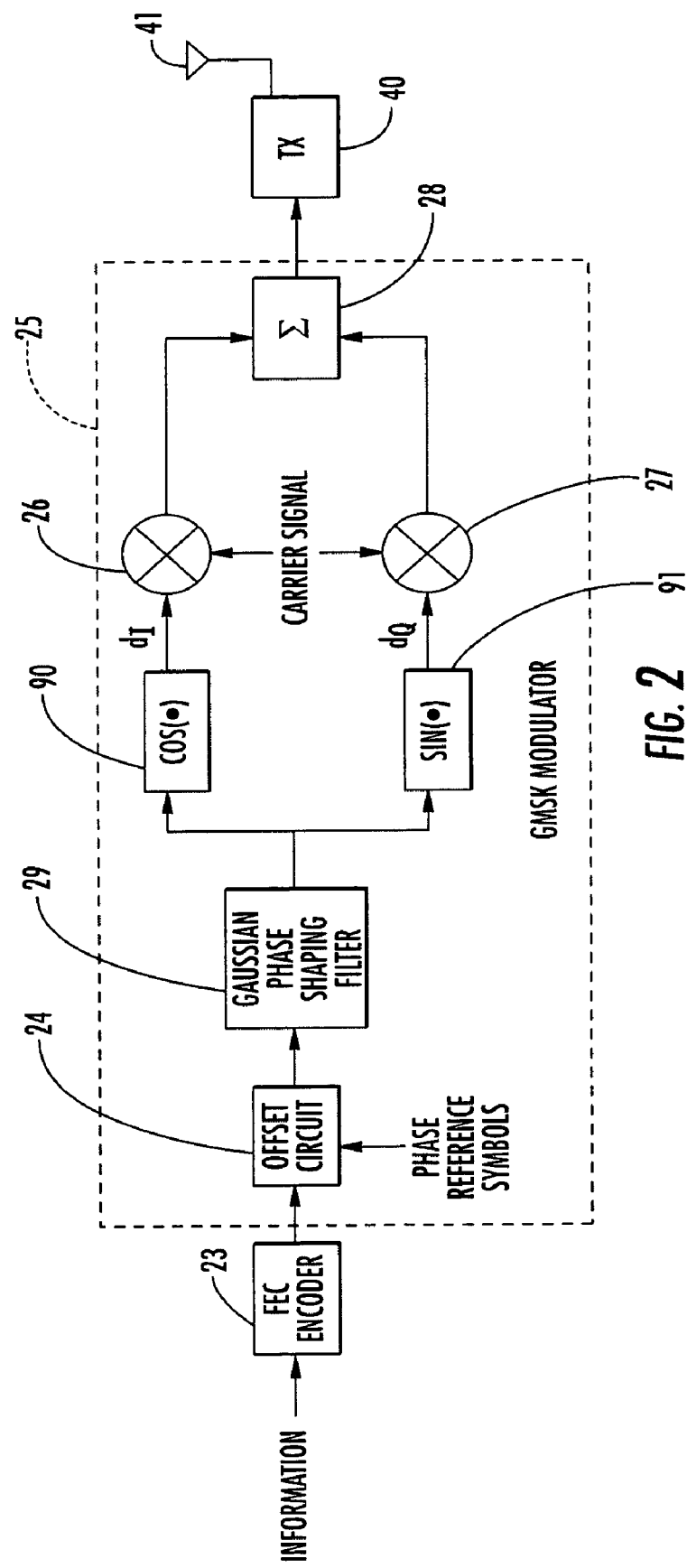
FIG. 2 is schematic block diagram further illustrating the transmission circuitry of the cellular communications system of FIG. 1.

In the exemplary embodiment illustrated in FIG. 2 for a GSM implementation, the modulator 25 is a Gaussian-filtered minimum shift keying (GMSK) modulator. However, it will be appreciated by those skilled in the art that other modulators may be used in accordance with the present invention for other cellular standards, such as an 8PSK modulator in the case of EDGE, for example. The GPSK modulator 25 illustratively includes a Gaussian phase shaping filter 29 downstream from the offset circuit 24, which integrates the output of the offset circuit and applies Gaussian frequency pulse shaping thereto.

Cosine (COS) and sine (SIN) function blocks 90, 91 are downstream from the Gaussian phase shaping filter 29 and generate in-phase (I) and quadrature (Q) components $d_I$ and $d_Q$ of the filtered information signal, respectively. The I and Q outputs from the cosine and sine function blocks 90, 91 are respectively combined with a carrier signal by mixers 26, 27, the outputs of which are summed by a summer 28 and provided to a transmitter 40 which cooperates with an associated antenna 41 to send the modulated waveform to the receive circuitry.

Generally speaking, the offset circuit 24 biases the information signal by creating an imbalance in the ratio of logic ones to zeros in the information sequence. This imbalance causes a predetermined amount of carrier energy to be "injected" into the spectral waveform, which appears as a spike at the desired carrier frequency. Stated alternately, the carrier frequency indicator is a predetermined amount of unmodulated carrier energy (i.e., carrier "leakage") that is intentionally injected into the modulated waveform by the offset circuit 24. Thus, the injected frequency resulting from the imbalance facilitates detection and recovery of the carrier at the receiver without the need for a non-linear based carrier regeneration circuit in the carrier recovery path of the receiver, as is typical of prior art devices. As such, the receive circuitry can detect and recover the carrier at a lower level of signal-to-noise ratio.

As noted above, the information signal generated by the FEC encoder 23 is a binary digital information signal. The offset circuit 24 changes values of the information signal (i.e., from logic 1 to logic 0, or vice-versa) to create the imbalance. That is, the offset circuit 24 determines if the information sequence has more logic ones than zeros, or vice-versa, or if it is substantially balanced in ones and zeros. If it is substantially balanced, the offset circuit 24 overwrites zeros with ones (or vice-versa) so that the ratio of ones to zeros is no longer one-to-one.

Generally speaking, the greater the imbalance in the ratio of logic ones to zeros, the greater the amount of unmodulated carrier energy that will be injected into the modulated waveform. Of course, the amount by which the ratio of ones to zeroes is to be changed will vary based upon the given application. For example, overwriting the ones and zeros introduces error in the information signal. The amount of error that can be tolerated will depend upon the type of error correction being used. Moreover, changing the ratio too much may result in an unacceptable amount of signal loss, as well as a violation of the applicable cellular standard.

Accordingly, it is preferable that the imbalance be as small as possible to provide suitable detection on the receiving end. For a GSM waveform, the ratio of logic ones to zeros may only need to be a few bits unbalanced (or less) to provide a suitably detectable carrier reference indicator. By contrast, in common prior art modulators for cellular systems, the ratio of logic ones and zeros in the information signal is carefully balanced (i.e., a one-to-one ratio) so that the carrier is suppressed.

The offset circuit 24 may also format the modulated waveform into a plurality of symbols suitable for the particular type of transmission being used in a given implementation, as will be appreciated by those skilled in the art. For example, the offset circuit 24 may insert a training symbol portion or sequence in accordance with an established cellular standard (e.g., GSM). The result is an input sequence signal that includes the biased information signal along with any applicable reference symbols and/or training symbols formatted in accordance with the standard for a particular cellular system application.

In addition, the offset circuit 24 also preferably inserts one or more phase reference symbols 35 (shown in solid black in FIGS. 4–6 for ease of reference) in the modulated waveform based upon the phase of the carrier signal. That is, the phase reference symbols indicate to the reception circuitry the original phase of the carrier signal so that discrepancies in phase which occur because of fading during transmission can be corrected, as will be discussed further below.

In the example illustrated in FIG. 4, the phase symbols 35 are included in the training symbol portion of the waveform. Since the training symbols are predefined, the receive circuitry will have a priori knowledge of the phase corresponding to the received phase reference symbols 35. However, in other embodiments the phase reference symbols 35 may be located elsewhere. For example, phase reference symbols 35' may be located in the guard band portions (FIG. 5). Further, phase reference symbols 35" may be located in the data symbol portions, as shown in FIG. 6.

Distributing the phase reference symbols advantageously provides enhanced phase tracking. Again, while this introduces a deliberate error in the information transmitted within the waveform, it may also provide enhanced phase tracking, and a certain amount of error may be tolerable because of the FEC. In other embodiments, phase reference symbols 35 may be located in more than one of the above noted symbol portions.

It should be noted that the phase reference symbols 35 are preferably in a form that is compliant with the particular cellular standard being used, and thus can be read by a typical cellular receiver designed for that standard, as will be appreciated by those skilled in the art. Additionally, a plurality of phase reference symbols 35 may be positioned in succession one after the next, and various spacings (including asymmetrical spacing) of the phase reference symbols may also be used, as will also be appreciated by those skilled in the art.

The offset circuit 24 may overwrite logic ones or zeros to provide the carrier frequency indicator in the same manner just described for the phase reference symbols. That is, in one embodiment, the offset circuit 24 overwrites one or more bits at randomly selected or predetermined locations in the data symbol portions, but not in the training symbol portion, to create the desired ratio of ones to zeros. In another embodiment, the offset circuit 24 overwrites one or more bits in the training symbol portion. In a still further embodiment, the offset circuit 24 instead of overwriting data or training bits may overwrite the symbols in the guard band portion(s) to unbalance the number of ones and zeros. Of course, symbols may be overwritten in more than one of the various GSM waveform portions.

Figure 9:
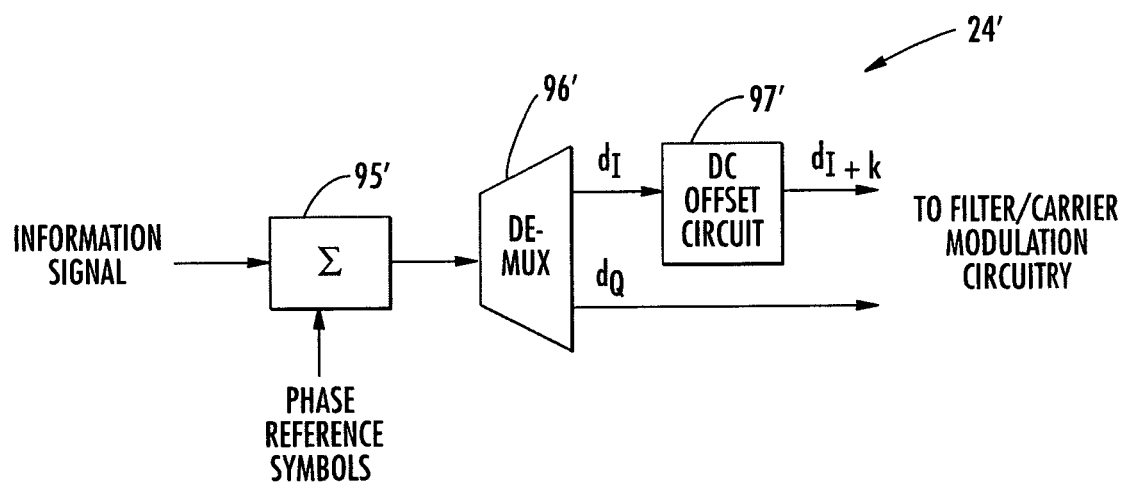
FIG. 9 is a schematic block diagram illustrating an alternate embodiment of the offset circuit of FIG. 1.

Yet another embodiment for providing the carrier frequency indicator is now described with reference to FIG. 9. In this embodiment, the offset circuit 24' includes a summer 95' for adding phase reference symbols 35 to the information signal, as discussed above. Yet, rather than using the cosine and sine function blocks 90, 91 to generate the I and Q components $d_I$ and $d_Q$, this may instead be done by a demultiplexer (DEMUX) 96' in the offset circuit 24'.

Further, rather than unbalancing the ratio of logic ones to zeros in the information sequence as discussed above, the offset circuit 24' instead includes a DC offset circuit 97' for biasing one (or both) of the components $d_I$, $d_Q$ so that the absolute value of the amplitude excursion that represents a data "one" is different from the absolute value of the amplitude excursion that represents a data "zero". In the illustrated embodiment, the $d_I$ component is biased by a constant DC value k. This approach will similarly introduce unmodulated carrier energy (i.e., leakage) into the modulated waveform to provide a carrier frequency indicator, as will be appreciated by those skilled in the art. It should be noted that the DC offset k may take various forms, i.e., this could be done using a chopped DC offset, etc. Further details on implementing the imbalance to cause carrier injection through carrier leakage and the advantages thereof may be found in the above-noted patent to Cobb et al.

Another related approach to providing the carrier frequency indicator is to separate the information signal into I and Q components using the cosine and sine function blocks 90, 91, as illustrated in FIG. 2, but to position the DC offset circuit 97' between the cosine processor 90 and mixer 26 (and/or between the sine processor 91 and the mixer 27). As will be appreciated by those skilled in the art, the end result from either case will be the injection of unmodulated carrier energy into the modulated waveform to provide the carrier frequency indicator, as with the other approaches described above. Of course, other suitable offset circuit 24 arrangements in addition to those described herein may also be used to provide the carrier frequency indicator.

Turning now to the receive circuitry, the base station 21 also includes one or more antennas 42 (illustratively shown as an antenna tower) and a front end 43 for receiving the modulated waveform. More particularly, the front end 23 illustratively includes (FIG. 3) a matched filter 44 for filtering the received waveform, although other suitable filters may also be used, as will be appreciated by those skilled in the art.

The front end 43 also illustratively includes an initial acquisition block 45 downstream from the RRC filter 44 for acquiring the received signal and communicating the acquisition to the remaining components. A bit/frame timing block 46 also downstream from the RRC filter is for generating a system timing signal based upon the received signal. A phase de-rotator 47 receives the system timing signal from the bit/frame timing block 46, and an output of the phase de-rotator is provided as an input to a mixer 48 along with the output of the RRC filter 44. The output of the mixer 48 is de-multiplexed by a de-multiplexer 49 based upon the system timing signal.

The outputs of the de-multiplexer 49 are respectively connected to a carrier reconstructor 50 and a demodulator 51. The carrier reconstructor 50 derives a local estimate of the carrier without recourse to a non-linear operation such as raising the signal (plus noise) to a power, which would normally be necessary in prior art receivers. In this case, the carrier reconstructor 50 exploits the carrier frequency indicator and phase reference symbols injected by the transmission circuitry to reconstruct the carrier using linear operations. This has the advantage of avoiding the noise enhancement affect of non-linear operations and allows the receiver to reconstruct the carrier at lower signal-to-noise ratios than would be possible if a non-linear operation was required. See the above-noted Cobb et al. patent for further details on this effect.

More particularly, the carrier reconstructor 50 illustratively includes a phase symbol correlator 52 connected to a first output of the de-multiplexer 49, and a phase/frequency estimator 53 downstream from the phase symbol correlator. The phase symbol correlator 52 performs a complex multiplication of the received phase reference symbols 35 plus noise with local phase symbols. This multiplication produces a complex product, r(t), including noise, whose phase, I, can be measured as $$\varphi = \tan^{-1}\left[\frac{\text{Im}(r)}{\text{Re}(r)}\right],$$

where the quadrant is to be taken into account. At high offset frequencies, the possibility of phase "wrapping" may also need to be considered, as will be appreciated by those skilled in the art.

From the output of the phase symbol correlator 52 and the carrier frequency indicator (i.e., the predetermined amount of unmodulated carrier energy) present in the I and Q components of the received waveform, the phase/frequency estimator 53 determines (i.e., estimates) the original phase and frequency of the carrier signal, as will be appreciated by those skilled in the art. By way of example, the phase/frequency estimator 53 may include a phase-lock loop, as discussed further in the Cobb et al. patent noted above.

Various approaches may be used to estimate the phase based upon the phase reference symbols 35. One approach is to use a mean estimation, i.e., to measure the average phase of phase reference symbols 35 present in a given GSM burst. Generally speaking, this may be done by summing the real and imaginary parts, respectively, of the correlated phase reference symbols 35 and inverting the sign of the imaginary sum, as will be appreciated by those skilled in the art.

Another approach is to use an end-to-end approach, in which the phase is represented by a line where the first and last reference symbols define the endpoints of the line. More particularly, using this approach the first and last phase reference symbols in each frame are sampled, and the real and imaginary parts of each phase reference symbol are summed and a phase of the resulting sums is determined. The change in phase across the frame is calculated and converted to a change in phase per symbol. Based upon the initial phase and the phase change per symbol, the phase of each symbol is calculated. The negative of the respective phase for each symbol and its real portion provide the carrier reference for demodulating that symbol, as will be appreciated by those skilled in the art.

Similarly, the phase may be represented by a line whose slope fits a minimum mean square error of the phase reference symbol. To do so, all of the phase reference symbols 35 in a burst are sampled and the phase of each is determined. Using a minimum mean squared algorithm, the offset and slope of the best fitting straight line through these points is derived. Using the equation of this line, a phase estimate is calculated for each symbol. Again, the negative of this phase and its real counterpart for each symbol provide the carrier reference for decoding that symbol.

Other suitable phase estimation approaches may also be used, as will be appreciated by those skilled in the art. The particular approach to be used will depend upon factors such as the number and placement of the phase reference symbols 35 in the burst, the amount of bit error rate (BER) than can be tolerated, phase accuracy required, etc., for a given implementation, as will be appreciated by those skilled in the art.

The demodulator 51 (e.g., a GMSK demodulator) demodulates the I and Q components of the information signal based upon the phase and frequency of the carrier signal determined by the phase/frequency estimator 53 to create "soft decision" estimates of the bits in the data portions of the received waveform. Those skilled in the art will appreciate that a soft decision includes a preliminary estimate of a data bit coupled with a measure of the confidence of that bit decision. In addition, the demodulator 51 may include an equalizer (not shown) to compensate for the effects of the radio channel, as will also be appreciated by those skilled in the art. Those skilled in the art will also appreciate that the use of a GMSK modulator in this embodiment is determined by the waveform standard for the cellular system, GPS and GPRS in this case, in which the receiver is intended to operate and that demodulator 51 may take other forms for other modulation formats (e.g., QPSK, 8PSK, QAM) as provided in the applicable cellular system standard.

A decoder 54 (e.g., an FEC decoder) is downstream from the demodulator 51 and reproduces the information based upon the demodulated I and Q components $d_I$, $d_Q$, as will be appreciated by those skilled in the art. The decoder 54 may perform a de-interleaving operation in series with error correction decoding, as will also be appreciated by those skilled in the art.

It should be noted that the above-described components may be implemented in various forms. For example, in certain embodiments components may be implemented as electronic circuits, while in others they may be implemented using processors (e.g., a digital signal processor (DSP)) and software, as will be appreciated by those skilled in the art.

Figure 7:
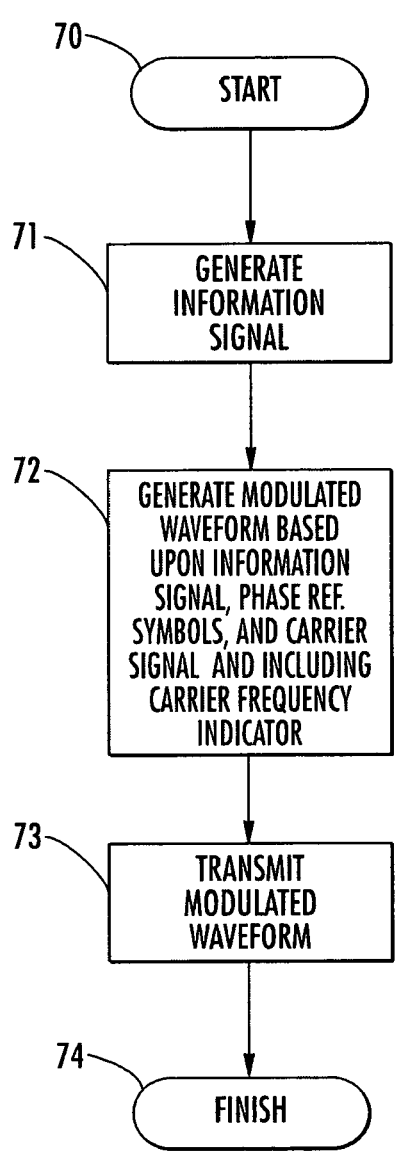
FIGS. 7–8 are flow diagrams illustrating cellular communications methods in accordance with the present invention.
Figure 8:
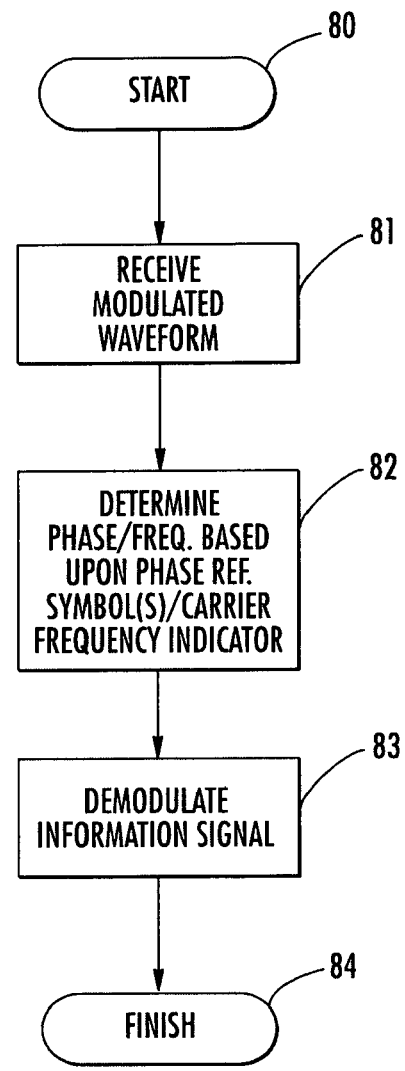

Referring to FIGS. 7 and 8, method aspects of the invention for communicating between a mobile cellular communications device 22a and a cellular base station 21 are now described. Beginning at Block 70, an information signal is generated, at Block 71, and a modulated waveform is generated based upon the information signal, a carrier signal, and at least one phase reference symbol so that it includes a carrier frequency indicator, at Block 72, as discussed previously above. The method further includes transmitting the modulated waveform to the cellular base station 21, at Block 73, thus concluding the illustrated method (Block 74).

Beginning at Block 80, a mobile cellular communications device 22 or the base station 21 receives a modulated waveform, at Block 81, determines the phase of the carrier signal based upon the phase reference symbol(s) 35 therein, and determines the frequency of the carrier signal based upon the carrier frequency indicator (Block 82), as discussed above. In addition, the information signal is demodulated (Block 83) based upon the determined phase and frequency of the carrier signal, thus concluding the illustrated method (Block 84).

It will therefore be appreciated based upon the foregoing description that the present invention provides numerous advantages. For example, the lock range of the demodulator 51 may be extended to provide improved link acquisition at very low signal-to-noise ratios. Moreover, the present invention allows the cellular system 20 to exploit the benefit of error correction at these low signal-to-noise ratios. In addition, the present invention allows services such as EDGE to more fully realize the benefits of the improved coding gain associated with more powerful error correction codes, such as turbo codes. Finally, it allows the waveform to conform with the established cellular standards so that legacy base stations and mobile devices that do not incorporate the present invention may interoperate with base stations and mobile devices that do incorporate it, albeit without obtaining the benefits of the present invention.

EXAMPLE

The foregoing will be further understood with reference to an example thereof, which will now be described with reference to FIGS. 10–13. This example is directed to an MSK modulation arrangement. This design is particularly applicable to a GSM/GPRS system, which uses GMSK modulation, and may also be useful in EDGE systems that use GMSK and 8PSK. The modulator described in this example has the added benefit of maintaining the constant envelope property of the signal, which provides opportunities for improved power efficiencies. This is particularly important in battery operated mobile communications devices such as those used in cellular communications systems.

As noted above, in accordance with the present invention a predetermined amount of unmodulated carrier energy is added to the standard modulated waveform to provide the carrier frequency indicator. More particularly, a small amount of carrier leakage (hereafter "carrier injection") is created by manipulation of the baseband signal. This provides opportunities for design efficiencies and for tailoring the signal to maintain desirable characteristics such as a constant envelope or low out-of-band emissions. However, as noted above, this could also be accomplished during the modulation process, if desired.

The general form of a constant envelope phase modulated signal is:

$$x(t)=A\cos(\omega t+\phi(t)), \qquad (1)$$

where A is a constant and $\phi(t)$ is the phase modulation that carries the information. With carrier injection, this signal is modified to be:

$$s(t)=A\cos(\omega t+\phi(t))+B\cos(\omega t+\theta). \qquad (2)$$

However, this signal does not maintain a constant envelope. It is preferable to find an alternate formulation that has both the carrier term and a constant envelope. To accomplish this, it is convenient to rewrite equation (1) in the bandpass form as follows:

$$x(t)=\cos(\phi(t))\cos(\omega t)-\sin(\phi(t))\sin(\omega t), \qquad (3)$$

where A=1 has been assumed for simplicity. Further, equation (2) can be rewritten in the following form:

$$s(t)=[\cos(\phi(t))+b]\cos(\omega t)-[\sin(\phi(t))+b]\sin(\omega t). \qquad (4)$$

In equation (4), b, B and $\theta$ are chosen arbitrarily.

As mentioned previously, equation (4) does not exhibit a constant envelope. However, it suggests the following basic form:

$$s(t)=[\cos(\phi(t))+f_1(\phi(t))+c]\cos(\omega t)-[\sin(\phi(t))+f_2(\phi(t))+c]\sin(\omega t). \qquad (5)$$

In equation (5), compensation functions $f_1(\phi(t))$ and $f_2(\phi(t))$ are selected to insure constant envelope, and offset constant c provides the carrier injection. It will be appreciated by those skilled in the art that there are many possibly choices for these functions and constants. Yet, since it is desirable to balance the effect of the modulation, the following form is a reasonable choice:

$$s(t)=[\cos(\phi(t))+f(\phi(t))\sin(\phi(t))+c]\cos(\omega t)-[\sin(\phi(t))-f(\phi(t))\cos(\phi(t))+c]\sin(\omega t). \qquad (6)$$

To determine the function $f(\phi(t))$, the envelope squared of equation (5) is determined as follows:

$$|s(t)|^2=[\cos(\phi(t))+f(\phi(t))\sin(\phi(t))+c]^2+[\sin(\phi(t))-f(\phi(t))\cos(\phi(t))+c]^2=K, \qquad (7)$$

where K is a constant. Expanding this expression and applying the quadratic formula yields the following expression for $f(\phi(t))$:

$$f(\phi(t))=c[\cos(\phi(t))-\sin(\phi(t))]\pm\{K-2c^2\sin(\phi(t)\cos(\phi(t))-2c[\cos(\phi(t))-\sin(\phi(t))]-c^2-1\}^{1/2}. \qquad (8)$$

Figure 10:
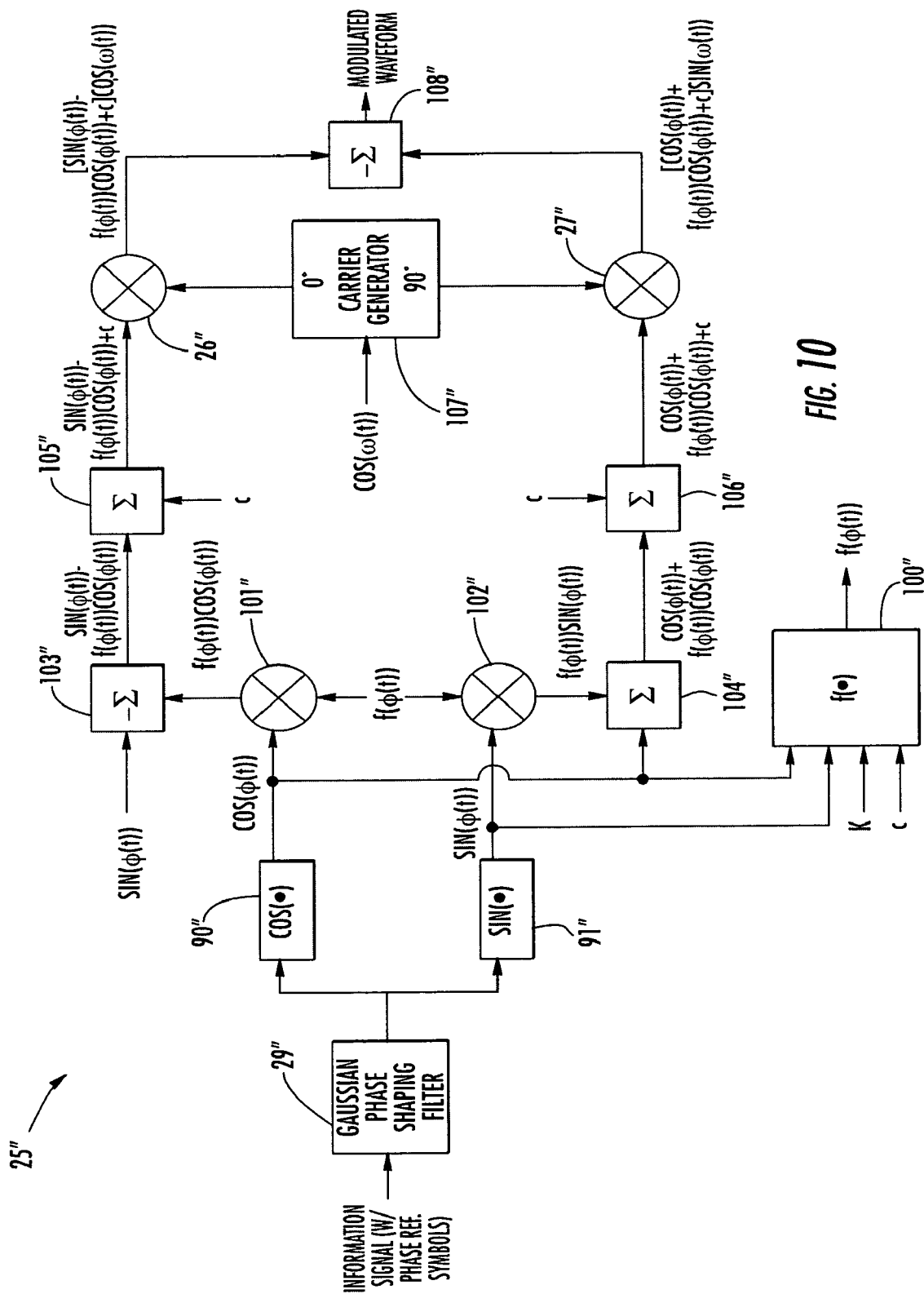
FIG. 10 is a schematic block diagram of an alternate embodiment of the modulator of FIG. 2.

An embodiment of the modulator 25" for implementing the foregoing is shown in FIG. 10. As previously described above, the information signal with phase reference symbols is input to the Gaussian phase shaping filter 29", which is followed by the cosine and sine function blocks 90", 91". The output of the cosine function block 90" ($\cos(\phi(t))$) is connected to a function generator 100" and a mixer (i.e., multiplier) 101". Similarly, the output of the sine function block 91" ($\sin(\phi(t))$) is connected to the function generator 100" and another mixer 102". The function generator 100" also receives as inputs the constant K and carrier injection value c, and it outputs $f(\phi(t))$ in accordance with equation (8), above.

The output of the function generator 100" is connected to both of the mixers 101", 102", which respectively provide outputs $f(\phi(t))\cos(\phi(t))$ and $f(\phi(t))\sin(\phi(t))$. The output of the mixer 101" is connected to a subtractor 103", which also receives $\sin(\phi(t))$ as a second input and thus provides as its output $\sin(\phi(t))-f(\phi(t))\cos(\phi(t))$. Similarly, the output of the mixer 102" is connected to a summer 104", which also receives $\cos(\phi(t))$ as an input and thus provides as its output $\cos(\phi(t))+f(\phi(t))\sin(\phi(t))$.

The carrier injection value c is added to the outputs of the subtractor 103" and summer 104" via summers 105" and 106" to provide the values $\sin(\phi(t))-f(\phi(t))\cos(\phi(t))+c$ and $\cos(\phi(t))+f(\phi(t))\sin(\phi(t))+c$, respectively. These values are then combined with respective carrier components generated by a carrier generator 107", which receives as its input $\cos(\omega t)$, via the mixers 26", 27" to provide the values $\cos(\phi(t))+f(\phi(t))\sin(\phi(t))+c]\cos(\omega t)$ and $[\sin(\phi(t))-f(\phi(t))\cos$ ($\phi(t)$)+c]sin(($\omega$t)). These values are then input to a subtractor 108'' which provides the value s(t) as set forth in equation (6) above as the modulated waveform.

Figure 11:
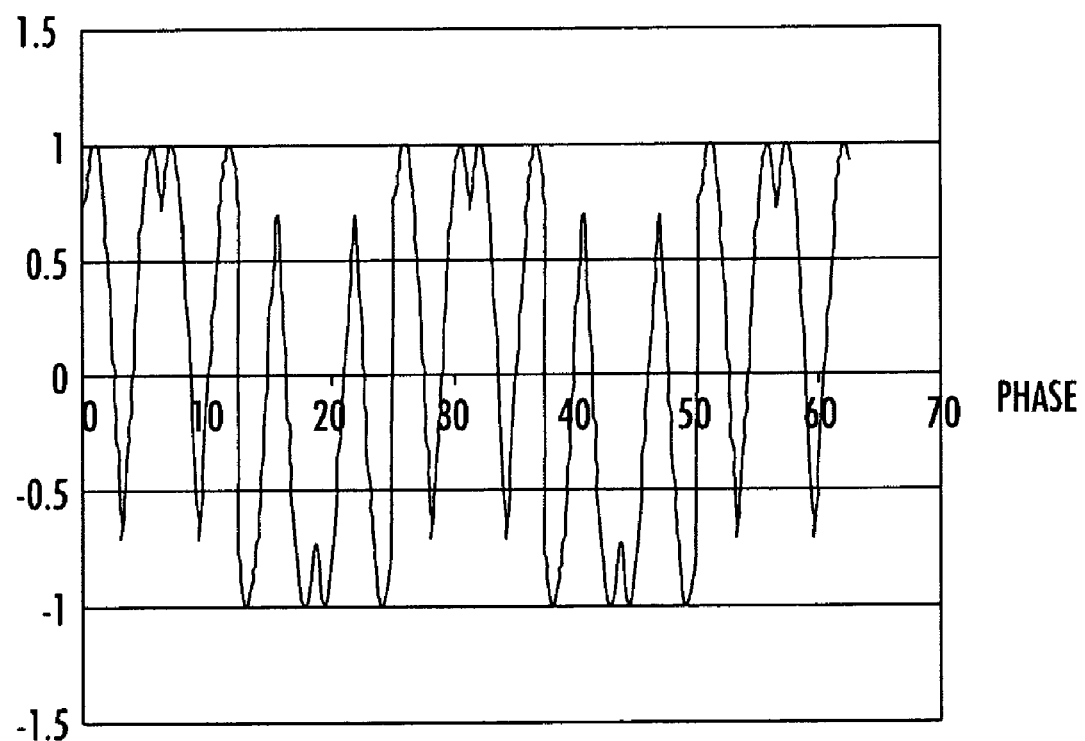
FIG. 11 is a graph illustrating a QPSK waveform in accordance with the prior art.
Figure 12:
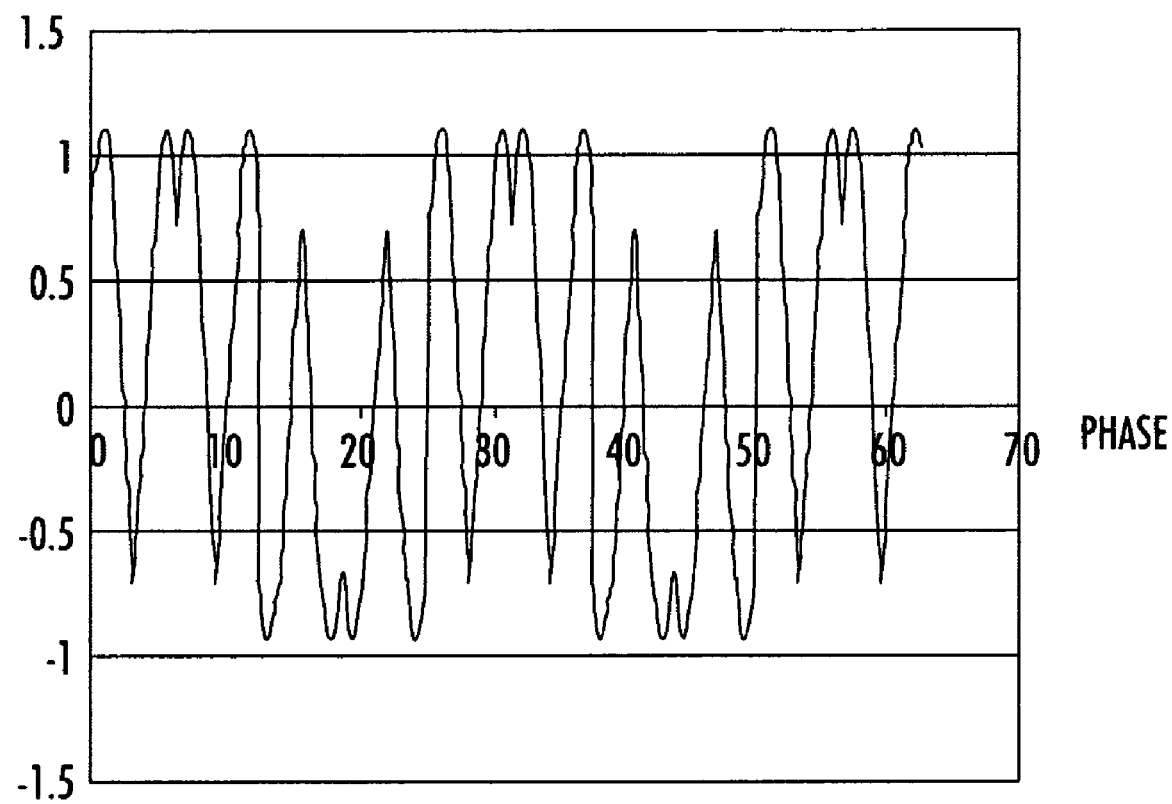
FIG. 12 is a graph illustrating a QPSK waveform offset to provide a carrier frequency indicator in accordance with the present invention.
Figure 13:
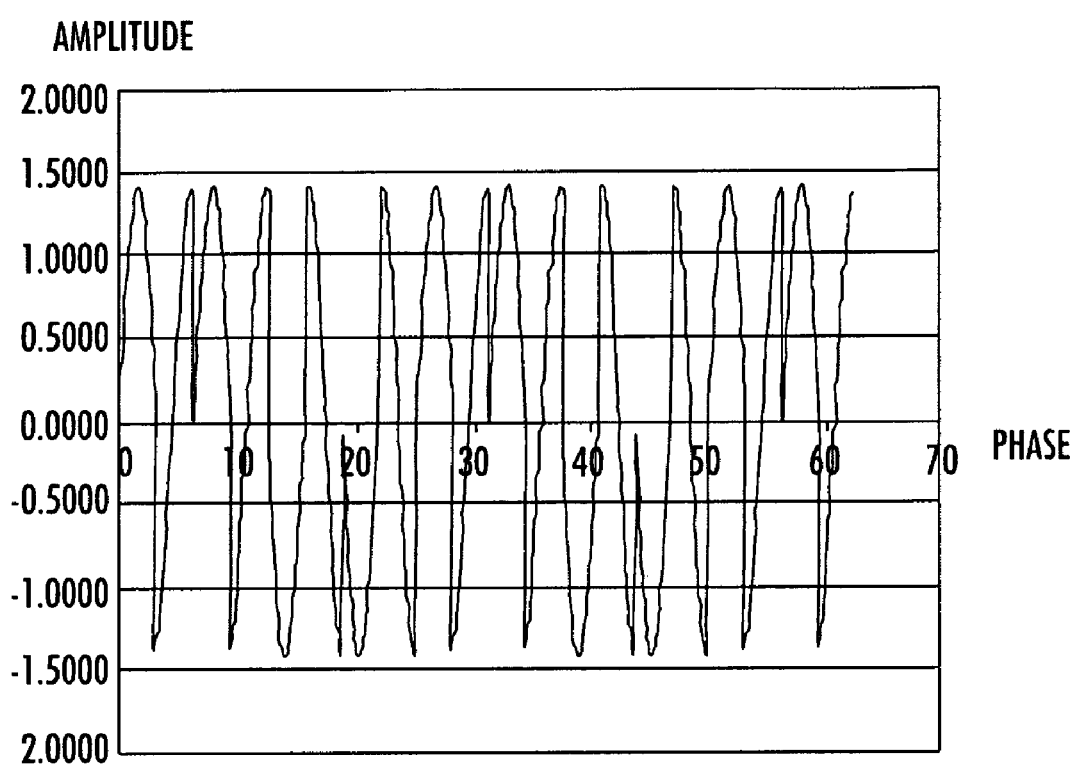
FIG. 13 is a graph illustrating a constant envelope waveform in accordance with the present invention.

The effectiveness of the foregoing approach can be seen in the graphs of FIGS. 11–13. More particularly, FIG. 11 shows a typical prior art QPSK waveform similar to that represented by equations (1) and (3). It should be noted that QPSK was selected for this illustrative example for clarity of explanation because it is a constant envelope modulation that uses a relatively simple phase modulation function $\phi(t)$. However, those skilled in the art will appreciate that this choice does not affect the general applicability of the example to other modulation types. By contrast, FIG. 12 illustrates a waveform with an offset (constant) added as in equations (2) and (4). It should be noted that in these figures A=1 and b=0.1. It can be seen in the figure that the addition of the offset, b, has resulted in the loss of the constant envelope property of the modulated signal. Additionally, FIG. 13 shows the waveform corresponding to equation (6) with the function derived in equation (8), where K=2 and c=0.1. It may be seen that the constant envelope is recovered by eliminating the "dc offset."

Figure 3:
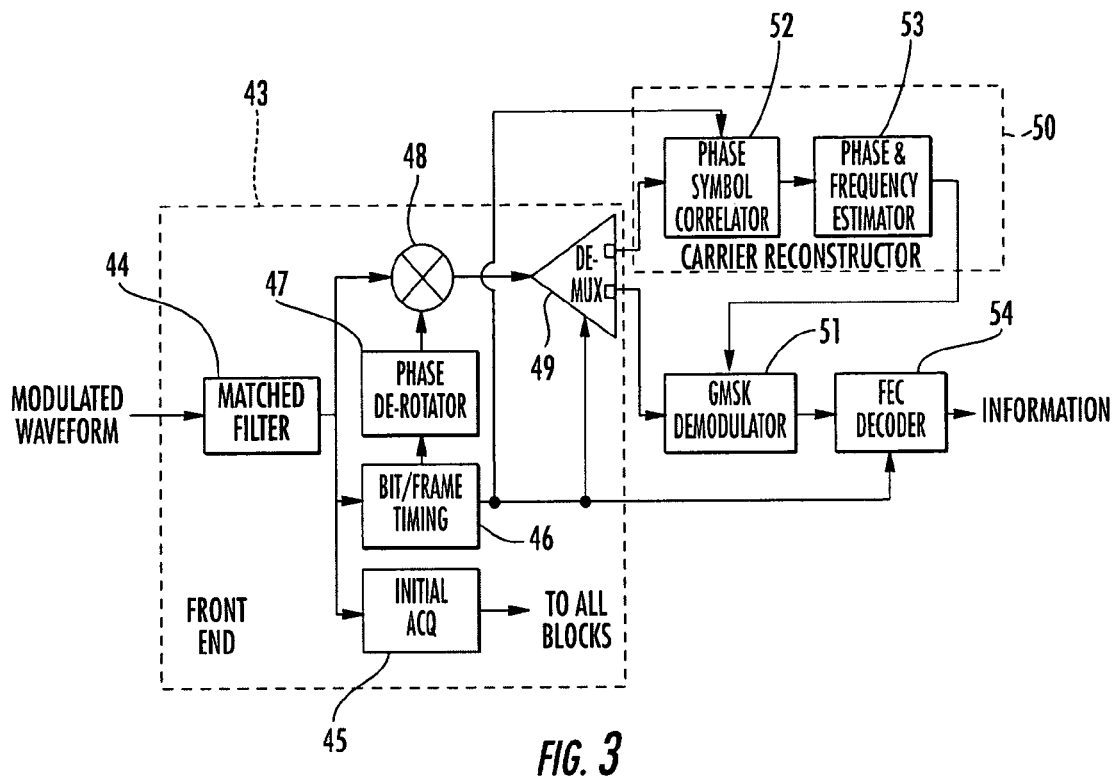
FIG. 3 is schematic block diagram further illustrating the reception circuitry of the cellular communications system of FIG. 1.

Desired demodulation of the modulated waveform may be accomplished using the receiver structure shown in FIG. 3, where the demodulator 51 is implemented as a conventional correlation demodulator, in which the local correlation reference signals have the form defined in equations (6) and (8). The carrier recovery circuitry in such a demodulator would take advantage of the carrier component in the waveform and the phase reference symbols to enable it to operate at very low signal-to-noise ratios. However, it can be seen by comparing the waveforms in FIG. 11 and FIG. 13 that the additional terms in equation (6) will appear as small distortion terms to a demodulator, which is designed for the waveform of equation (1), which will be the case for prior art cellular receivers that do not include this invention. Thus, the combined addition of the compensation functions and the offset constant in the modulated signal provides superior performance when the receiver is designed to exploit them, while a standard, prior art demodulator that is not designed to exploit these features may still demodulate the data.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A cellular communications system comprising:
   at least one cellular base station and a plurality of mobile cellular communications devices for communicating therewith;
   said at least one cellular base station and said mobile cellular communications devices each comprising
     an encoder for generating an information signal,
     a modulator for generating a modulated waveform based upon the information signal, a carrier signal having a frequency and phase associated therewith, and at least one carrier phase reference symbol, said modulator comprising an offset circuit so that the modulated waveform comprises a carrier frequency indicator, and
     a transmitter for transmitting the modulated waveform.

2. The cellular communications system of claim 1 wherein the carrier frequency indicator comprises a predetermined amount of unmodulated carrier energy.

3. The cellular communications system of claim 1 wherein said offset circuit biases the information signal, and wherein the carrier frequency indicator is based upon the bias of the information signal.

4. The cellular communications system of claim 3 wherein the information signal comprises a binary digital information signal, and wherein said offset circuit biases the binary digital information signal by changing values thereof.

5. The cellular communications system of claim 4 wherein said offset circuit changes values based upon a ratio of first to second logic values in the digital information signal.

6. The cellular communications system of claim 3 wherein said offset circuit separates the information signal into in-phase (I) and quadrature (Q) components, and biases at least one of the I and Q components with a direct current (DC) offset.

7. The cellular communications system of claim 3 wherein said offset circuit separates the information signal into in-phase (I) and quadrature (Q) components, and biases at least one of the I and Q components based upon a compensation function to provide a constant envelope modulation.

8. The cellular communications system of claim 1 wherein each of said mobile cellular communications devices and said at least one cellular base station further comprises:
   a front end for receiving a modulated waveform;
   a carrier reconstructor for determining the phase of the carrier signal associated with the received modulated waveform based upon the at least one phase reference symbol, and for determining the frequency of the carrier signal based upon the carrier frequency indicator;
   a demodulator for demodulating the information signal based upon the determined phase and frequency of the carrier signal; and
   a decoder for decoding the demodulated information signal.

9. The cellular communications system of claim 8 wherein the at least one phase reference symbol comprises a plurality thereof; and wherein said carrier reconstructor comprises a phase symbol correlator for correlating the plurality of phase reference symbols.

10. The cellular communications system of claim 1 wherein the modulated waveform comprises a training symbol portion, and wherein said offset circuit inserts the at least one phase reference symbol in the training symbol portion.

11. The cellular communications system of claim 1 wherein the modulated waveform comprises at least one guard band portion, and wherein said offset circuit inserts the at least one phase reference symbol in the at least one guard band portion.

12. The cellular communications system of claim 1 wherein the modulated waveform comprises at least one data symbol portion, and wherein said modulator inserts the at least one phase reference symbol in the at least one data symbol portion.

13. The cellular communications system of claim 1 wherein said modulator comprises a Gaussian-filtered minimum shift keying (GMSK) modulator.

14. The cellular communications system of claim 1 wherein said at least one cellular base station and said mobile cellular communications devices operate in accordance with the Global System for Mobile Communications (GSM) standard.

15. The cellular communications system of claim 1 wherein said at least one cellular base station and said mobile cellular communications devices operate in accordance with the General Packet Radio Service (GPRS) standard.

16. The cellular communications system of claim 1 wherein said at least one cellular base station and said mobile cellular communications devices operate in accordance with the Enhanced Data Rates for Global Evolution (EDGE) standard.

17. The cellular communications system of claim 1 wherein said encoder comprises a forward error correction (FEC) encoder.

18. A cellular communications system comprising:
   at least one cellular base station and a plurality of mobile cellular communications devices for communicating therewith;
   said at least one cellular base station and said mobile cellular communications devices each comprising
      a front end for receiving a modulated waveform generated based upon an information signal, a carrier signal having a frequency and phase associated therewith, and at least one carrier phase reference symbol, and the modulated waveform comprising a carrier frequency indicator,
      a carrier reconstructor for determining the phase of the carrier signal based upon the at least one phase reference symbol, and for determining the frequency of the carrier signal based upon the carrier frequency indicator,
      a demodulator for demodulating the information signal based the determined phase and frequency of the carrier signal, and
      a decoder for decoding the demodulated information signal.

19. The cellular communications system of claim 18 wherein the carrier frequency indicator comprises a predetermined amount of unmodulated carrier energy.

20. The cellular communications system of claim 18 wherein the at least one phase reference symbol comprises a plurality thereof; and wherein said carrier reconstructor comprises a phase symbol correlator for correlating the plurality of phase reference symbols.

21. The cellular communications system of claim 18 wherein the modulated waveform comprises a training symbol portion, and wherein the at least one phase reference symbol is in the training symbol portion.

22. The cellular communications system of claim 18 wherein the modulated waveform comprises at least one guard band portion, and wherein the at least one phase reference symbol is in the at least one guard band portion.

23. The cellular communications system of claim 18 wherein the modulated waveform comprises at least one data symbol portion, and wherein the at least one phase reference symbol is in the at least one data symbol portion.

24. The cellular communications system of claim 18 wherein said demodulator comprises a Gaussian-filtered minimum shift keying (GMSK) demodulator.

25. The cellular communications system of claim 18 wherein said at least one cellular base station and said mobile cellular communications devices operate in accordance with at least one of the Global System for Mobile Communications (GSM) standard, the General Packet Radio Service (GPRS) standard, and the Enhanced Data Rates for Global Evolution (EDGE) standard.

26. The cellular communications system of claim 18 wherein said decoder comprises a forward error correction (FEC) decoder.

27. A cellular base station for communicating with a plurality of mobile cellular communications devices comprising:
   an encoder for generating an information signal;
   a modulator for generating a modulated waveform based upon the information signal, a carrier signal having a frequency and phase associated therewith, and at least one carrier phase reference symbol, said modulator comprising an offset circuit so that the modulated waveform comprises a carrier frequency indicator; and
   a transmitter for transmitting the modulated waveform.

28. The cellular base station of claim 27 wherein the carrier frequency indicator comprises a predetermined amount of unmodulated carrier energy.

29. The cellular base station of claim 27 wherein said offset circuit biases the information signal, and wherein the carrier frequency indicator is based upon the bias of the information signal.

30. The cellular base station of claim 29 wherein the information signal comprises a binary digital information signal, and wherein said offset circuit biases the binary digital information signal by changing values thereof.

31. The cellular base station of claim 29 wherein said offset circuit changes values based upon a ratio of first to second logic values in the digital information signal.

32. The cellular base station of claim 29 wherein said offset circuit separates the information signal into in-phase (I) and quadrature (Q) components, and biases at least one of the I and Q components with a direct current (DC) offset.

33. The cellular base station of claim 27 wherein said modulator operates in accordance with at least one of the Global System for Mobile Communications (GSM) standard, the General Packet Radio Service (GPRS) standard, and the Enhanced Data Rates for Global Evolution (EDGE) standard.

34. A cellular base station for communicating with a plurality of mobile cellular communications devices comprising:
   a front end for receiving a modulated waveform generated based upon an information signal, a carrier signal having a frequency and phase associated therewith, and at least one carrier phase reference symbol, and the modulated waveform comprising a carrier frequency indicator;
   a carrier reconstructor for determining the phase of the carrier signal based upon the at least one phase reference symbol, and for determining the frequency of the carrier signal based upon the carrier frequency indicator;
   a demodulator for demodulating the information signal based the determined phase and frequency of the carrier signal; and
   a decoder for decoding the demodulated information signal.

35. The cellular base station of claim 34 wherein the carrier frequency indicator comprises a predetermined amount of unmodulated carrier energy.

36. The cellular base station of claim 34 wherein the at least one phase reference symbol comprises a plurality thereof; and wherein said carrier reconstructor comprises a phase symbol correlator for correlating the plurality of phase reference symbols.

37. The cellular base station of claim 34 wherein the modulated waveform comprises a training symbol portion, and wherein the at least one phase reference symbol is in the training symbol portion.

38. The cellular base station of claim 34 wherein the modulated waveform comprises at least one guard band portion, and wherein the at least one phase reference symbol is in the at least one guard band portion.

39. The cellular base station of claim 34 wherein the modulated waveform comprises at least one data symbol portion, and wherein the at least one phase reference symbol is in the at least one data symbol portion.

40. The cellular base station of claim 34 wherein said at least one cellular base station and said mobile cellular communications devices operate in accordance with at least one of the Global System for Mobile Communications (GSM) standard, the General Packet Radio Service (GPRS) standard, and the Enhanced Data Rates for Global Evolution (EDGE) standard.

41. A mobile cellular communications device for communicating with a cellular base station comprising:
an encoder for generating an information signal;
a modulator for generating a modulated waveform based upon the information signal, a carrier signal having a frequency and phase associated therewith, and at least one carrier phase reference symbol, said modulator comprising an offset circuit so that the modulated waveform comprises a carrier frequency indicator; and
a transmitter for transmitting the modulated waveform.

42. The mobile cellular communications device of claim 41 wherein the carrier frequency indicator comprises a predetermined amount of unmodulated carrier energy.

43. The mobile cellular communications device of claim 41 wherein said offset circuit biases the information signal, and wherein the carrier frequency indicator is based upon the bias of the information signal.

44. The mobile cellular communications device of claim 43 wherein the information signal comprises a binary digital information signal, and wherein said offset circuit biases the binary digital information signal by changing values thereof.

45. The mobile cellular communications device of claim 44 wherein said offset circuit changes values based upon a ratio of first to second logic values in the digital information signal.

46. The mobile cellular communications device of claim 43 wherein said offset circuit separates the information signal into in-phase (I) and quadrature (Q) components, and biases at least one of the I and Q components with a direct current (DC) offset.

47. The mobile cellular communications device of claim 43 wherein said offset circuit separates the information signal into in-phase (I) and quadrature (Q) components, and biases at least one of the I and Q components based upon a compensation function to provide a constant envelope modulation.

48. The mobile cellular communications device of claim 41 wherein said modulator operates in accordance with at least one of the Global System for Mobile Communications (GSM) standard, the General Packet Radio Service (GPRS) standard, and the Enhanced Data Rates for Global Evolution (EDGE) standard.

49. A mobile cellular communications device for communicating with a cellular base station comprising:
a front end for receiving a modulated waveform generated based upon an information signal, a carrier signal having a frequency and phase associated therewith, and at least one carrier phase reference symbol, and the modulated waveform comprising a carrier frequency indicator;
a carrier reconstructor for determining the phase of the carrier signal based upon the at least one phase reference symbol, and for determining the frequency of the carrier signal based upon the carrier frequency indicator;
a demodulator for demodulating the information signal based the determined phase and frequency of the carrier signal; and
a decoder for decoding the demodulated information signal.

50. The mobile cellular communications device of claim 49 wherein the carrier frequency indicator comprises a predetermined amount of unmodulated carrier energy.

51. The mobile cellular communications device of claim 49 wherein the at least one phase reference symbol comprises a plurality thereof; and wherein said carrier reconstructor comprises a phase symbol correlator for correlating the plurality of phase reference symbols.

52. The mobile cellular communications device of claim 49 wherein the modulated waveform comprises a training symbol portion, and wherein the at least one phase reference symbol is in the training symbol portion.

53. The mobile cellular communications device of claim 49 wherein the modulated waveform comprises at least one guard band portion, and wherein the at least one phase reference symbol is in the at least one guard band portion.

54. The mobile cellular communications device of claim 49 wherein the modulated waveform comprises at least one data symbol portion, and wherein the at least one phase reference symbol is in the at least one data symbol portion.

55. The mobile cellular communications device of claim 49 wherein said at least one cellular base station and said mobile cellular communications devices operate in accordance with at least one of the Global System for Mobile Communications (GSM) standard, the General Packet Radio Service (GPRS) standard, and the Enhanced Data Rates for Global Evolution (EDGE) standard.

56. A method for communicating between a mobile cellular communications device and a cellular base station comprising:
generating an information signal;
generating a modulated waveform based upon the information signal, a carrier signal having a frequency and phase associated therewith, and at least one carrier phase reference symbol using a modulator comprising an offset circuit so that the modulated waveform comprises a carrier frequency indicator; and
transmitting the modulated waveform.

57. The method of claim 56 wherein the carrier frequency indicator comprises a predetermined amount of unmodulated carrier energy.

58. The method of claim 56 further comprising:
receiving the modulated waveform;
determining the phase of the carrier signal associated with the received modulated waveform based upon the at least one phase reference symbol, and determining the frequency of the carrier signal based upon the carrier frequency indicator; and
demodulating the information signal based upon the determined phase and frequency of the carrier signal.

59. The method of claim 56 wherein the offset circuit biases the information signal, and wherein the carrier frequency indicator is based upon the bias of the information signal.

60. The method of claim 59 wherein the information signal comprises a binary digital information signal, and wherein the offset circuit biases the binary digital information signal by changing values thereof.

61. The method of claim 60 wherein the offset circuit changes values based upon a ratio of first to second logic values in the digital information signal.

62. The method of claim 59 wherein the offset circuit separates the information signal into in-phase (I) and quadrature (Q) components, and biases at least one of the I and Q components with a direct current (DC) offset.

63. The method of claim 59 wherein the offset circuit separates the information signal into in-phase (I) and quadrature (Q) components, and biases at least one of the I and Q components based upon a compensation function to provide a constant envelope modulation.

64. The method of claim 56 wherein the modulator operates in accordance with at least one of the Global System for Mobile Communications (GSM) standard, the General Packet Radio Service (GPRS) standard, and the Enhanced Data Rates for Global Evolution (EDGE) standard.

65. A method for communicating between a mobile cellular communications device and a cellular base station comprising:
receiving a modulated waveform generated based upon an information signal, a carrier signal having a frequency and phase associated therewith, and at least one carrier phase reference symbol, and the modulated waveform comprising a carrier frequency indicator;
determining the phase of the carrier signal based upon the at least one phase reference symbol, and determining the frequency of the carrier signal based upon the carrier frequency indicator; and
demodulating the information signal based the determined phase and frequency of the carrier signal.

66. The method of claim 65 wherein the carrier frequency indicator comprises a predetermined amount of unmodulated carrier energy.

67. The method of claim 65 wherein the at least one phase reference symbol comprises a plurality thereof; and wherein determining the phase of the carrier signal comprises correlating the plurality of phase reference symbols.

68. The method of claim 65 wherein the modulated waveform comprises a training symbol portion, and wherein the at least one phase reference symbol is in the training symbol portion.

69. The method of claim 65 wherein the modulated waveform comprises at least one guard band portion, and wherein the at least one phase reference symbol is in the at least one guard band portion.

70. The method of claim 65 wherein the modulated waveform comprises at least one data symbol portion, and wherein the at least one phase reference symbol is in the at least one data symbol portion.

71. The method of claim 65 wherein the at least one cellular base station and the mobile cellular communications devices operate in accordance with at least one of the Global System for Mobile Communications (GSM) standard, the General Packet Radio Service (GPRS) standard, and the Enhanced Data Rates for Global Evolution (EDGE) standard.

* * * * *

UNITED STATES PATENT AND TRADEMARK OFFICE
CERTIFICATE OF CORRECTION

PATENT NO. : 7,062,228 B2
APPLICATION NO. : 10/842742
DATED : June 13, 2006
INVENTOR(S) : Olds It is certified that error appears in the above-identified patent and that said Letters Patent is hereby corrected as shown below:

FIG. 13     Delete: "FIG. 13"
            Insert -- FIG. 13 --

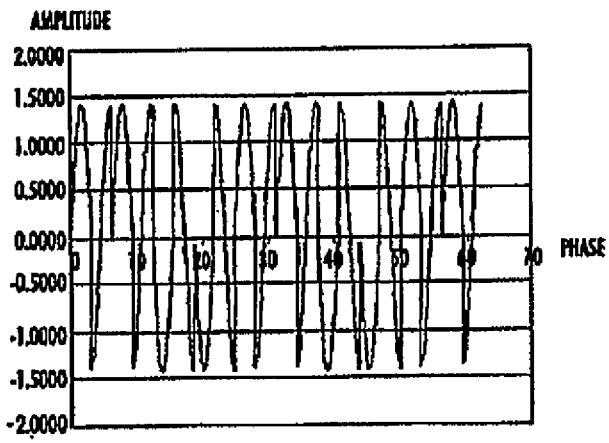

Column 1, Line 63     Delete: "analysis"
                      Insert -- Analysis --

Column 4, Line 13     Delete: "is schematic"
                      Insert -- is a schematic --

Column 4, Line 16     Delete: "is schematic"
                      Insert -- is a schematic --

Column 5, Line 40     Delete: "able defer"
                      Insert -- able to defer --

Column 9, Line 32     Delete: "I"
                      Insert -- $\phi$ --

Column 12, Line 21    Delete: "possibly"
                      Insert -- possible --

UNITED STATES PATENT AND TRADEMARK OFFICE
CERTIFICATE OF CORRECTION

PATENT NO. : 7,062,228 B2
APPLICATION NO. : 10/842742
DATED : June 13, 2006
INVENTOR(S) : Olds It is certified that error appears in the above-identified patent and that said Letters Patent is hereby corrected as shown below:

| | |
|---|---|
| Column 13, Line 1 | Delete: "(($\omega$t)" <br> Insert -- ($\omega$t) -- |
| Column 15, Line 35 | Delete: "based the" <br> Insert -- based upon the -- |
| Column 16, Line 56 | Delete: "based the" <br> Insert -- based upon the -- |
| Column 18, Line 10 | Delete: "based the" <br> Insert -- based upon the -- |

Signed and Sealed this

Sixth Day of February, 2007

JON W. DUDAS
*Director of the United States Patent and Trademark Office*